(12) United States Patent
Orcic et al.

(10) Patent No.: US 12,001,366 B2
(45) Date of Patent: Jun. 4, 2024

(54) INTERCHANGEABLE COMPUTING NODES

(71) Applicant: Harman Becker Automotive Systems GmbH, Karlsbad (DE)

(72) Inventors: Krunoslav Orcic, Karlsruhe (DE); Günther Kraft, Karlsruhe (DE); Jibin Yuan, Ettlingen (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 52 days.

(21) Appl. No.: 17/665,250

(22) Filed: Feb. 4, 2022

(65) Prior Publication Data

US 2022/0245081 A1 Aug. 4, 2022

Related U.S. Application Data

(60) Provisional application No. 63/145,882, filed on Feb. 4, 2021.

(51) Int. Cl.
*G06F 13/40* (2006.01)
*G06F 13/38* (2006.01)

(52) U.S. Cl.
CPC ........ *G06F 13/4022* (2013.01); *G06F 13/385* (2013.01); *G06F 13/4068* (2013.01); *G06F 13/409* (2013.01); *G06F 2213/0038* (2013.01)

(58) Field of Classification Search
CPC .............................................. G06F 2213/0038
See application file for complete search history.

(56) References Cited

U.S. PATENT DOCUMENTS

| | | | | |
|---|---|---|---|---|
| 8,781,442 | B1 * | 7/2014 | Link, II | H04L 9/30 370/338 |
| 11,650,851 | B2 * | 5/2023 | Palermo | G06F 9/5044 718/1 |
| 2007/0115808 | A1 * | 5/2007 | Ying | H04L 1/22 370/222 |
| 2015/0373482 | A1 * | 12/2015 | Barnard | H04W 4/024 370/338 |
| 2016/0128238 | A1 * | 5/2016 | Shedd | F25B 41/42 361/679.47 |
| 2018/0286913 | A1 * | 10/2018 | Wang | H01L 27/14618 |
| 2020/0186970 | A1 * | 6/2020 | Dekovich | B60R 25/245 |
| 2020/0209867 | A1 * | 7/2020 | Valois | G05D 1/0257 |
| 2021/0120259 | A1 * | 4/2021 | Nair | H04N 19/423 |
| 2021/0190516 | A1 * | 6/2021 | Ventimiglia | G01N 33/0031 |
| 2021/0210429 | A1 * | 7/2021 | Liu | H03F 1/565 |
| 2021/0282300 | A1 * | 9/2021 | Gopalakrishna | H05K 7/20509 |

(Continued)

*Primary Examiner* — Henry Tsai
*Assistant Examiner* — Aurangzeb Hassan
(74) *Attorney, Agent, or Firm* — Angela M. Brunetti (57) ABSTRACT

An in-vehicle control device a mainboard with at least one connection exposed at a first panel of a housing. One or more connectors in a second panel of the housing are interconnected with the mainboard and accessible from outside the housing for connecting the mainboard to a vehicle system. A mounting frame cooperates with the housing at the first panel of the housing exposing the connection to the mainboard, and at least one interchangeable node, computing node and/or connectivity node, is detachably connected to the mounting frame. The at least one interchangeable node has a connector for connecting to the mainboard, and at least one System-on-a-Chip (SoC) having scalable performance capabilities, or a high-performance antenna.

19 Claims, 10 Drawing Sheets

(56) References Cited

U.S. PATENT DOCUMENTS

| | | | |
|---|---|---|---|
| 2022/0104359 A1* | 3/2022 | Patil | H01L 25/16 |
| 2022/0142011 A1* | 5/2022 | Doo | B60L 53/22 |
| | | | 361/697 |
| 2022/0326743 A1* | 10/2022 | Kraft | H05K 7/20136 |
| 2022/0352622 A1* | 11/2022 | Choudhury | H04W 4/40 |

* cited by examiner

INTERCHANGEABLE COMPUTING NODES

CROSS-REFERENCE

Priority is claimed to application Ser. No. 63/145,882 filed Feb. 4, 2021, in the United States, the disclosure of which is incorporated herein by reference in its entirety.

TECHNICAL FIELD

The present disclosure relates to an in-vehicle computing node and more particularly, to an interchangeable node for modifying/upgrading vehicle features.

BACKGROUND

Traditionally, vehicles have a computing system that is fixed, or static, and without expensive modifications to both hardware and software, the features available on a vehicle are not easily modified or updated. Today's consumer is accustomed to having immediate access to the latest and greatest features in technology and this is driving a need for a simplified transition from one generation to a next generation of electronic control module that enables car manufacturers to meet the consumer market for new features in a manner that is efficient and cost effective.

There are many reasons that necessitate a need to upgrade hardware and software for in-vehicle electronic control units. An everchanging landscape of new features, new versions of operating systems, new user interfaces, etc., on vehicles that are becoming more software-based than hardware-based has resulted in an increased demand for higher performance from processors, both in processing power and in memory and storage capabilities. For example, a demand for high-definition maps, more complex human-machine-interface (HMI), introducing Artificial Intelligence (AI), data logging and additional driver-support applications drive a need for more memory and storage. Many of these additional features and applications also drive the need for improved connectivity, and ultimately improved security, which also require wireless connectivity with external devices and higher bandwidth capabilities. As technology for driver support systems develops, there is a need for one or more ECUs to interface with more sensors and actuators located on the vehicle. As display technology improves, there is a need for the ECU to support higher resolution and/or additional displays on the vehicle. These are just a few examples of system requirements that result in a need to retrofit and upgrade older generations of computing nodes with newer, faster, more powerful replacements.

Unfortunately, each OEM has their own software stack, interfaces, communication protocols, over-the-air updates systems, etc. that are specific to an OEM and may be even specific to each vehicle model making it difficult to modularize hardware for the OEM. The OEM specific systems also make it difficult to modularize hardware across OEMs. And, just in general, current systems have a structure that makes it difficult to update/upgrade software and/or decouple hardware from software. This is particularly true in after-market applications.

There is a need for flexibility in ECU systems that will make them modifiable, updatable, and expandable without unnecessary complexity to OEMs and their customers.

SUMMARY

An in-vehicle control device having a mainboard with at least one connection exposed at a first panel of a housing. One or more connectors in a second panel of the housing are interconnected with the mainboard and accessible from outside the housing for connecting the mainboard to a vehicle system. A mounting frame cooperates with the housing at the first panel of the housing exposing the connection to the mainboard, and at least one interchangeable node is detachably connected to the mounting frame.

In one or more embodiments, the at least one interchangeable node has a connector for connecting to the mainboard, and the interchangeable computing node has at least one System-on-a-Chip (SoC) having scalable performance capabilities. In one or more embodiments, the at least one interchangeable node has a connector for connecting to the mainboard, and the interchangeable computing node has a connectivity node detachably connected thereto.

An in-vehicle control device having a mainboard with a connection exposed at a first panel of a housing. A mounting frame cooperates with the housing at the first panel of the housing and has at least one interchangeable node detachably connected thereto. The at least one interchangeable node further comprises a connector for connecting to the mainboard connection exposed at the first panel of the housing, at least one System-on-a-Chip (SoC) having scalable performance capabilities, and at least one connector for connecting to a vehicle system. In one or more embodiments, the at least one interchangeable node further comprises a connector for connecting to the mainboard and a BT/WiFi antenna to offer scalable performance in a contained internal high performance antenna.

Elements and steps in the figures are illustrated for simplicity and clarity and have not necessarily been rendered according to any sequence. For example, steps that may be performed concurrently or in different order are illustrated in the figures to help to improve understanding of embodiments of the present disclosure.

DETAILED DESCRIPTION

While various aspects of the present disclosure are described with reference to FIGS. 1 through 9C, the present disclosure is not limited to such embodiments, and additional modifications, applications, and embodiments may be implemented without departing from the present disclosure. In the figures, like reference numbers will be used to illustrate the same components. Those skilled in the art will recognize that the various components set forth herein may be altered without varying from the scope of the present disclosure.

The term Electronic Control Unit (ECU) refers to an embedded system that controls one or more electrical systems or subsystems in a vehicle. Types of ECUs include, but are not limited to, an electronic/engine control module, a powertrain control module, a transmission control module, a brake control module, a central control module, a body control module, a suspension control module, and vehicles may incorporate several of these modules. Communication channels refer to physical transmission mediums such as a wire or logical connection over multiplexed medium such as a radio channel. Channels are used to convey information signals, for example a digital bit stream, from one or more transmitters or receivers. A channel has a certain capacity for transmitting information, often measured by its bandwidth in Hz or its data rate in bits per second. Communication channels, also called pathways, use media and broadcast. Network based services refer to web, physical cable, WiFi, mobile, Bluetooth, RF and GPS.

Any one or more the ECUs, servers, receivers, or devices described herein include computer executable instructions that may be compiled or interpreted from computer programs created using a variety of programming languages and/or technologies. In general, a processor (such as a microprocessor) receives instructions, for example from a memory, a computer-readable medium, or the like and executes instructions. A processing unit includes a non-transitory computer-readable storage medium capable of executing instructions of a software program. The computer-readable storage medium may be, but is not limited to, an electronic storage device, a semi-conductor storage device, or any suitable combination thereof. Any one or more of these devices may rely on firmware, which may require updates from time to time to ensure compatibility with operating systems, improvements and additional functionality, security updates or the like. Connecting networking server, receivers or devices may include, but are not limited to, PCIe, USB, WiFi, lightning, Ethernet, UFS, eMMC, 5G, etc. One or more servers, receivers, or devices may operate using a dedicated operating system, multiple software programs and/or platforms for interfaces such as graphics, audio, wireless networking, enabling applications, integrating hardware of vehicle components, systems, and external devices such as mobile phones, tablets, or other systems.

Figure 1A:
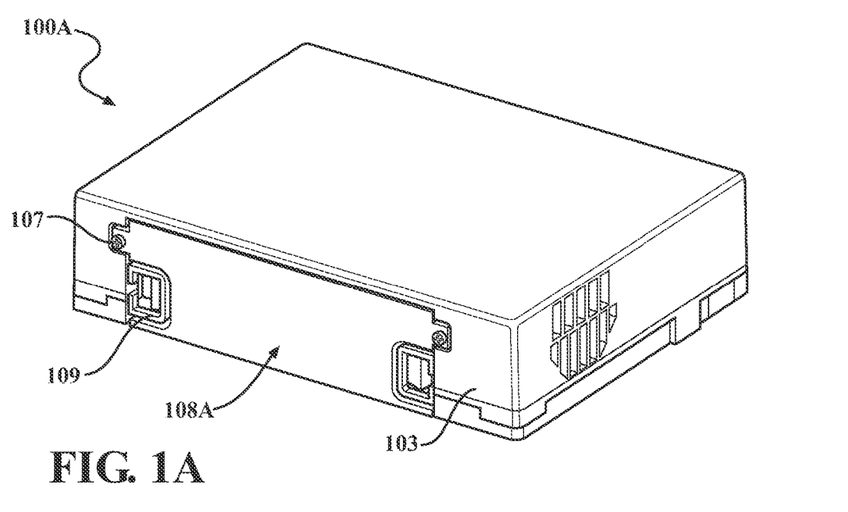
FIG. 1A is a perspective view of a control module for a vehicle system.
Figure 1B:
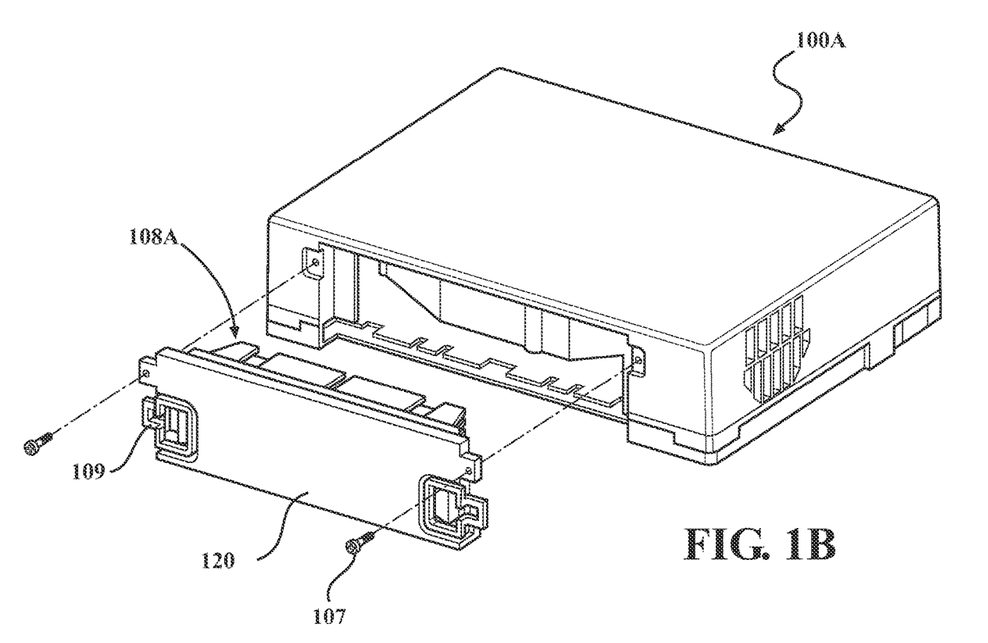
FIG. 1B is an exploded view of the control module of FIG. 1A.

FIG. 1A is a perspective front view of a module 100A for use in a vehicle. The module 100 has an interchangeable node 108A with screws 107, clips 109, or a combination thereof attaching the interchangeable computing node 108A to a front panel 103 of the module 100. FIG. 1B is an exploded view of the module 100 of FIG. 1A.

Figure 1C:
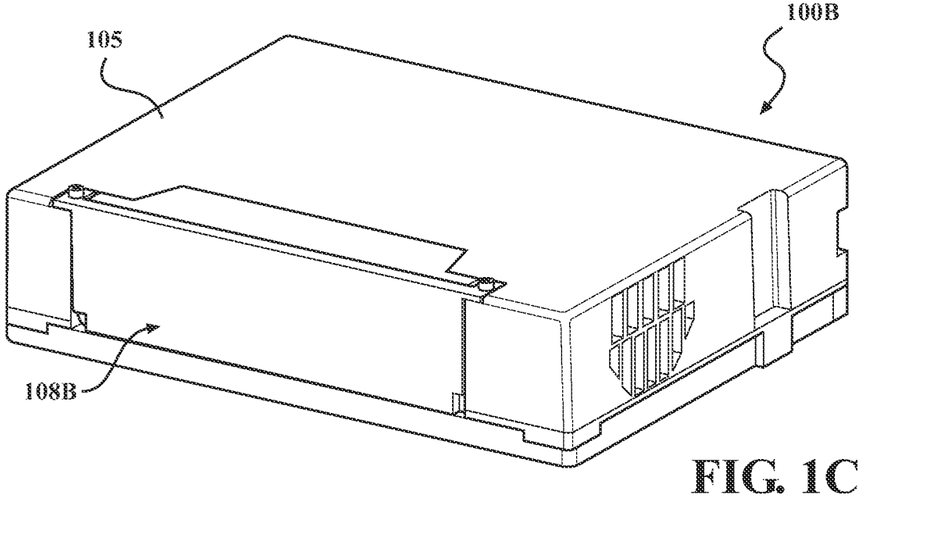
FIG. 1C is a perspective view of a control module for a vehicle system.
Figure 1D:
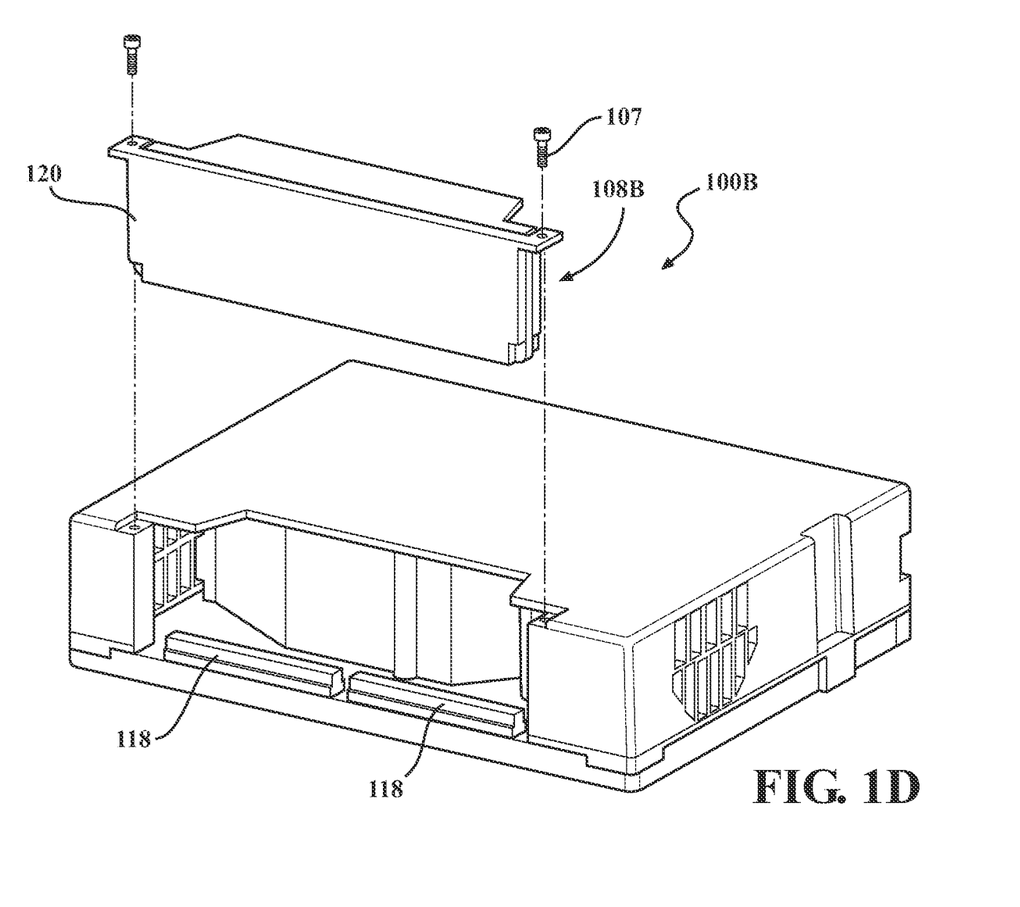
FIG. 1D is an exploded view of the control module of FIG. 1C.

FIG. 1C is a perspective front view of a module 100B for use in a vehicle. The module 100B has an interchangeable node 108B that is accessed from a top panel 105 of the module. FIG. 1D is an exploded view of the module 100B.

Figure 1E:
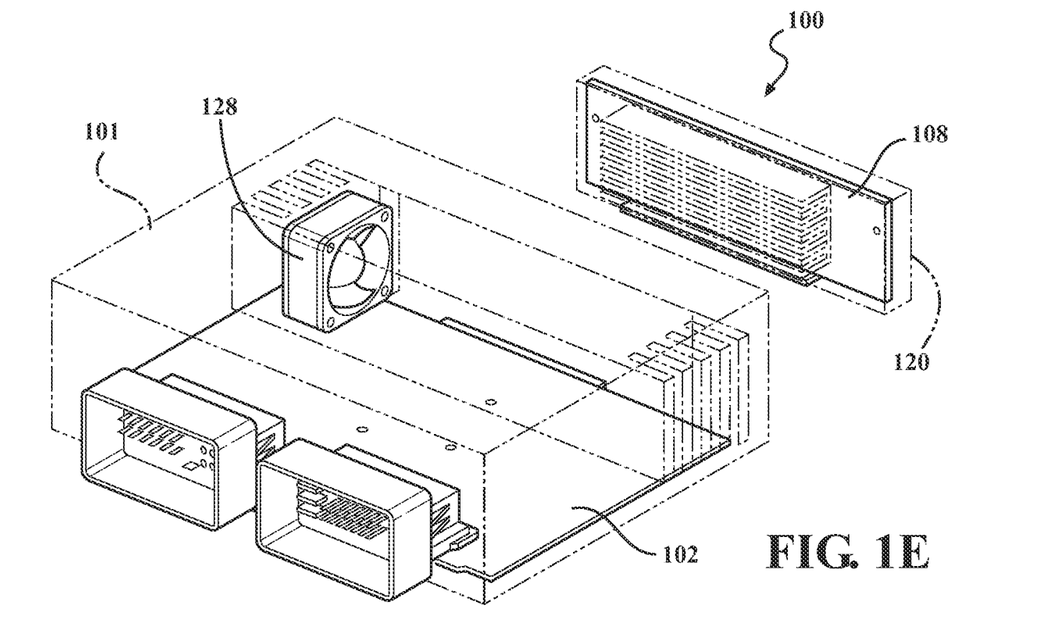
FIG. 1E is an exploded view of a control module for a vehicle system.
Figure 1F:
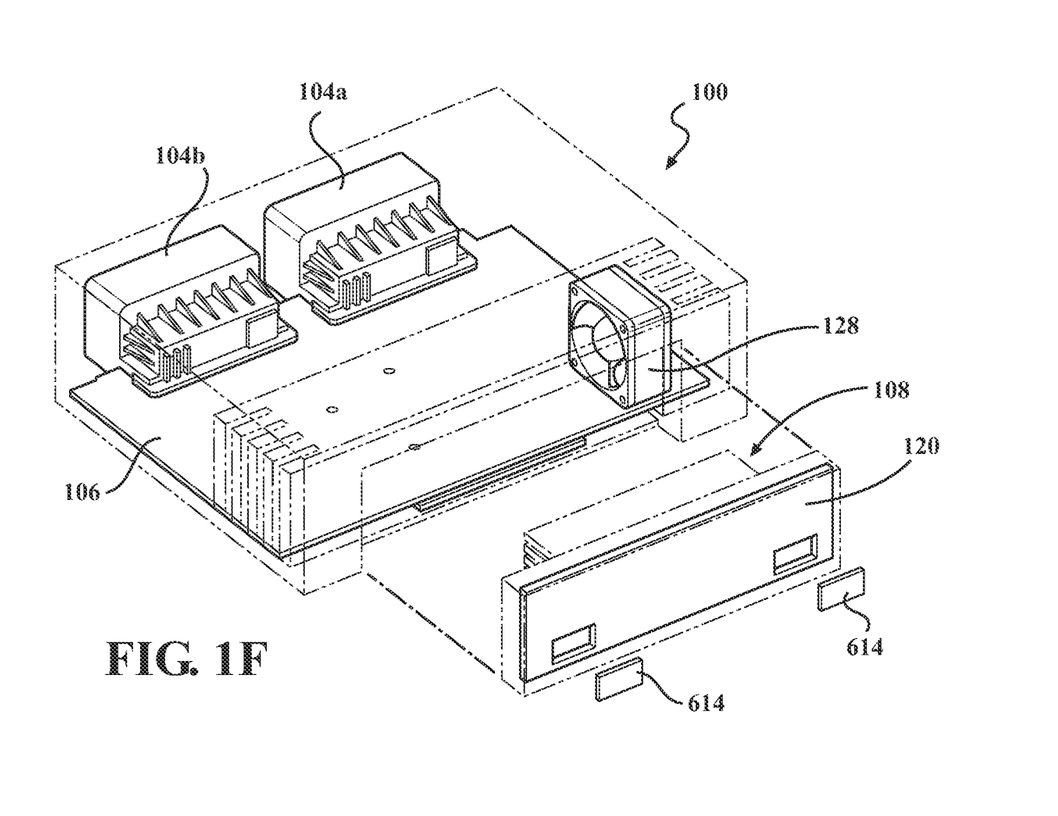
FIG. 1F is an exploded view of a control module for a vehicle system.

FIG. 1E is an exploded rear view of a module 100 having a housing 101 that houses a core 102 having connectors 104a, 104b and a mainboard 106. FIG. 1F is an exploded front view of the module 100. The core 102 is generic and therefore, may be used across OEM platforms as well as across OEMs. The core has modifiable connectors 104a and 104b interconnectedly attached to the mainboard for connecting the module 100 to any one or more in-vehicle systems (not shown). The mainboard 106 and connectors 104a, 104b are exposed at a first panel of the housing and will be discussed in detail later herein. Module 100 is reusable for different OEMs.

The module 100 is customizable by way of an interchangeable node 108 that is connected to the core 102. In the example shown, the interchangeable computing node 108 is positioned on the housing 101, for example at a front surface 103 of the housing 101, so that it is easily accessed for upgrade or replacement. However, its location on the housing and its accessibility may be determined by other specifications desired by a particular OEM, supplier, or customer preference as shown in FIGS. 1A and 1C. In addition, see FIG. 1F, the front of the interchangeable computing node 108 includes optional Bluetooth and/or WiFi antennas 614 (see also FIGS. 9A-9C), enabling a good connection. The housing 101 has mounting features, such as mounting brackets, to adapt to different assembly methods within the vehicle, configurations for which the possibilities are too numerous to list here.

Figure 2A:
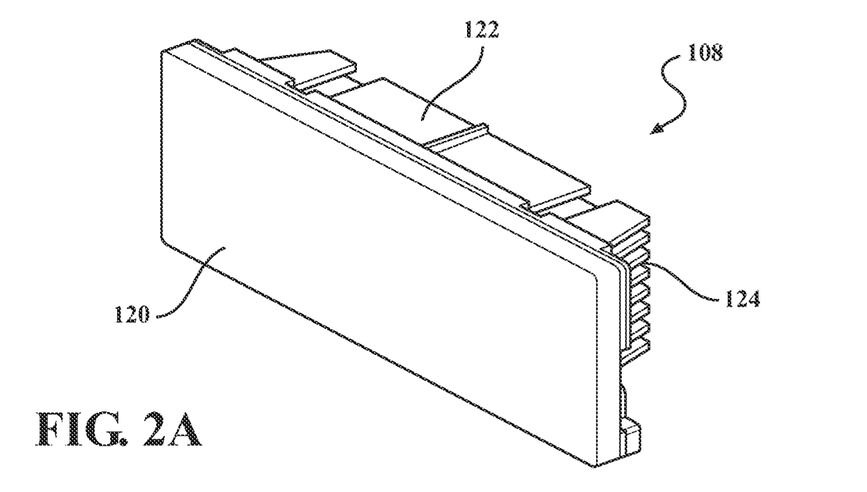
FIG. 2A is a perspective front view of an interchangeable computing node.
Figure 2B:
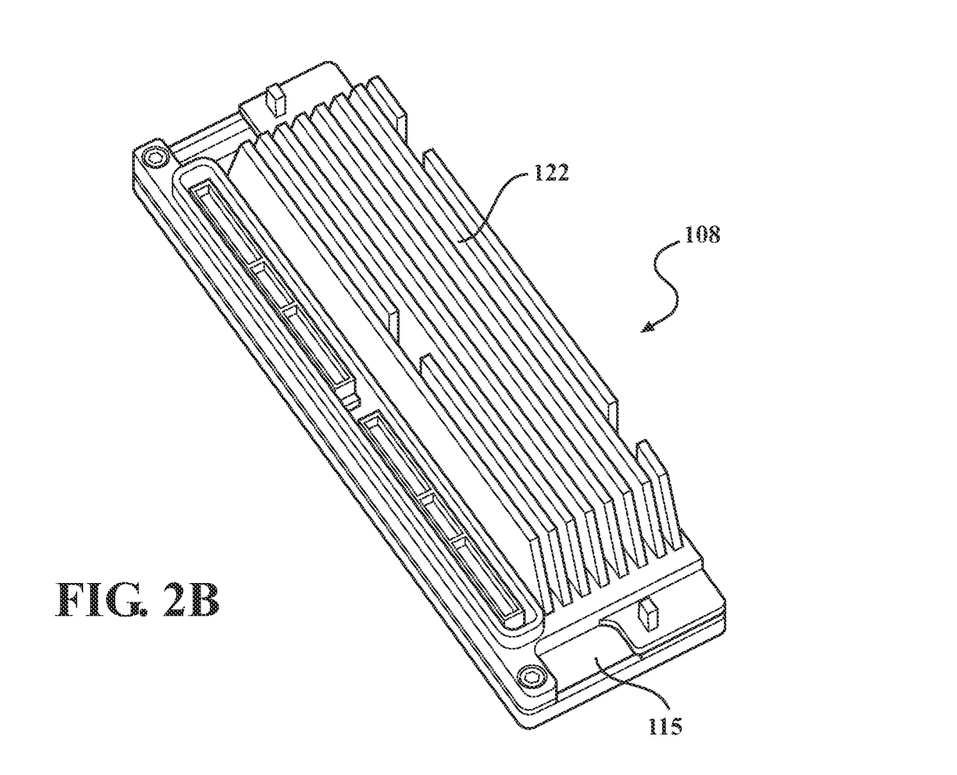
FIG. 2B is a perspective rear view of an interchangeable computing node.
Figure 2C:
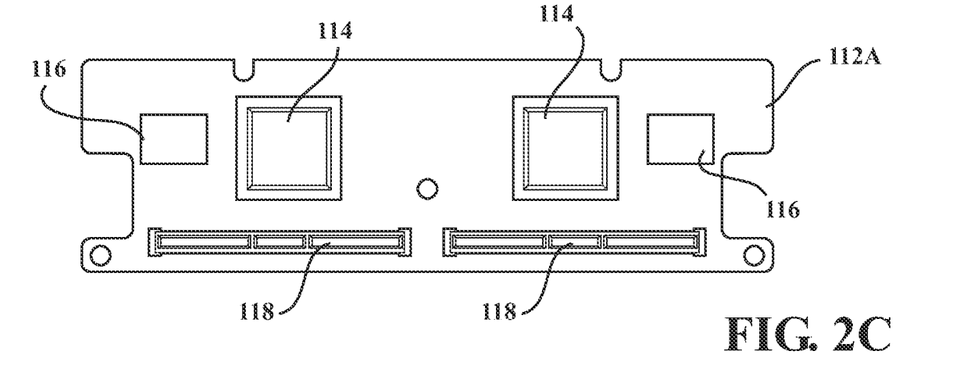
FIG. 2C is a front view of one or more embodiments of a printed circuit board of the interchangeable computing node.

FIGS. 2A and 2B are perspective views of the interchangeable node 108. FIG. 2C is a front view of a printed circuit board 112A of the node 108 having two SoCs (aka System-on-Chip) 114. The printed circuit board 112A is attached to a backside 115 of a mounting frame 120. The interchangeable node 108 may host one or two SoCs 114 and memory storage 116 such as, but not limited to, ROM, RAM, and DRAM. An edge interface on the interchangeable node 108 has a connector 118 to interface with the mainboard 106 of the core 102 at the first surface of the panel that exposes the mainboard 106 connection.

Figure 2D:
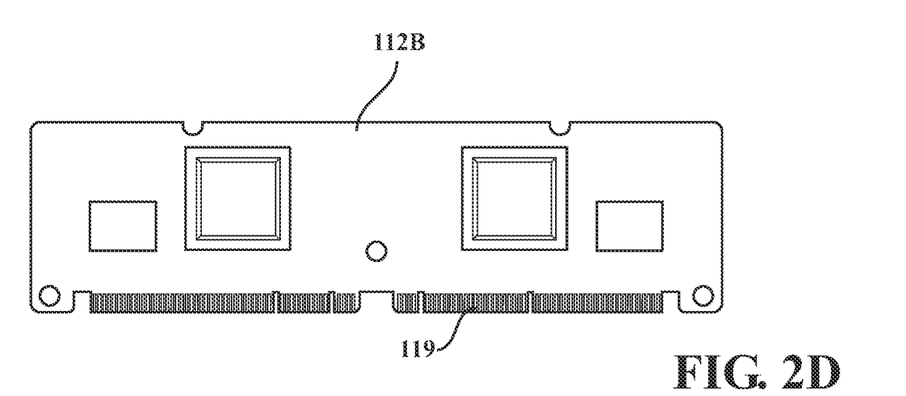
FIG. 2D is a front view of one or more embodiments of a printed circuit board of the interchangeable computing node.

Alternatively, FIG. 2D shows one or more embodiments of a printed circuit board 112B that has a predetermined number of pins 119 along the edge interface for connecting to one or more connectors (see 118 in FIG. 1D) on the mainboard.

FIG. 2A shows a perspective view of the interchangeable node 108 showing the mounting frame 120. Mounting frame 120 mechanically attaches to the housing (not shown). The mounting frame 120 has a standard size and mounting capabilities that accommodate one or two printed circuit boards 112. The mounting frame 120 may hold one or two SoCs in either a monolithic or double configuration. So that it is possible to mount a single SoC, a single module with two SoCs or two individual modules each with its own SoC to the mainboard 106 and the housing 101 with a standard mounting frame size and configuration.

The interchangeable node 108 may be an interchangeable computing node have a single compute module with a single SoC, two single compute modules each with a single SoC, or two SoCs on a single compute module. In configurations with two SoCs, the SoCs may have scalable performance capabilities and have different computing performances, with different functionalities and different memory densities. In some instances, the second SoC may be used for different hardware extensions such as a Graphic Processing Unit (GPU) or Neural Processing Unit (NPU), in which case, it will have a microcontroller for interface bridging.

Figure 3A:
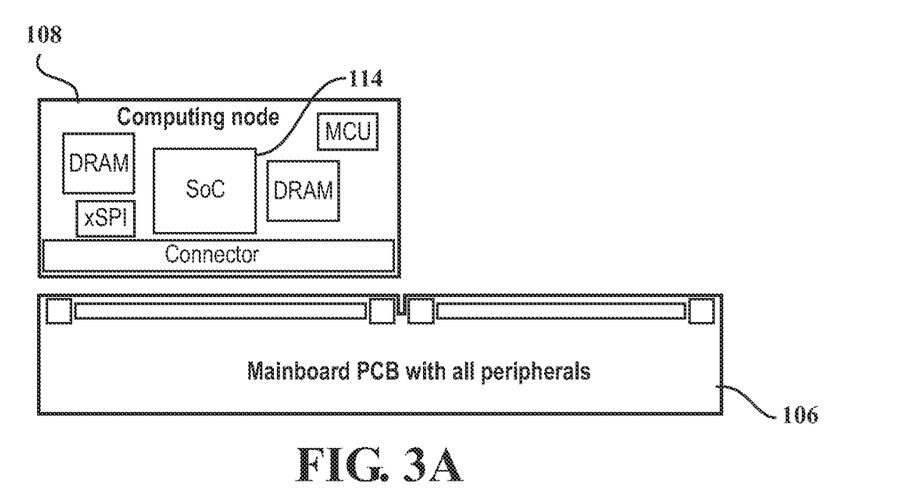
FIG. 3A is a block diagram of a mainboard with an interchangeable computing node having a single System-on-Chip (SoC)
Figure 3B:
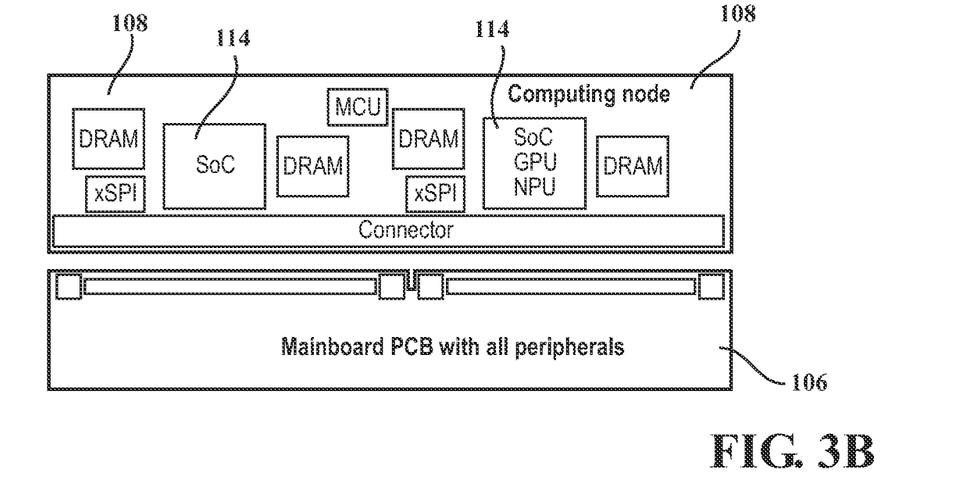
FIG. 3B is a block diagram of a mainboard with a monolithic interchangeable computing node having two SoCs.
Figure 3C:
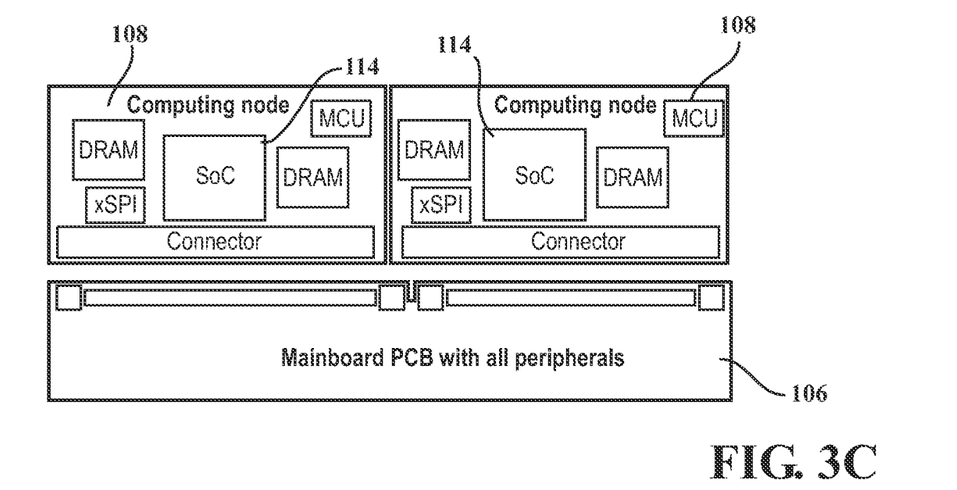
FIG. 3C is a block diagram of a mainboard with two interchangeable computing nodes.

FIGS. 3A, 3B and 3C show possible configurations for the interchangeable node 108 and mainboard 106. The interchangeable node 108 with two SOCs 114 may be a single monolithic module or it may be a symmetric arrangement of two modules, placed next to each other, hosting one SoC each. FIG. 3A shows the mainboard 106 and an interchangeable node that is a computing node 108 with a single SoC. FIG. 3B shows a single monolithic module with two SoCs symmetrically arranged next to each other. In the example shown in FIG. 3B, one of the SoCs is enhanced with, for example, general processing units, GPUs, NPUs and/or additional SoCs. FIG. 3C shows an interchangeable node 108 two individual computing nodes each with their own SoC. In any one of these possible configurations, the interchangeable nodes 108 are connected to the exposed connection at the mainboard 106 in a manner for which the mounting plate (not shown) is the same.

Figure 4:
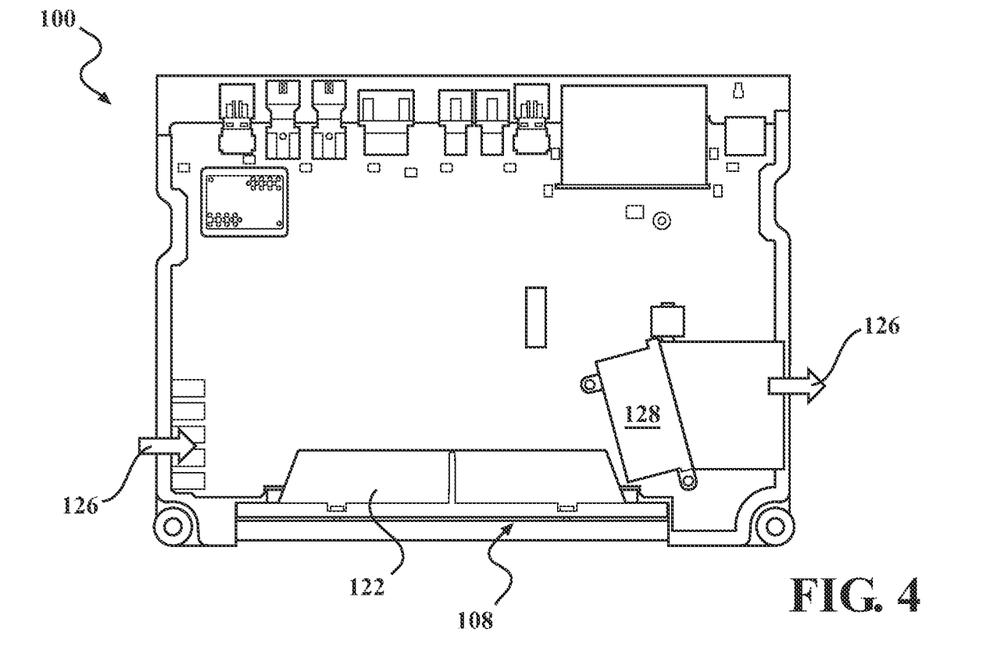
FIG. 4 is a cutaway top view of a control module.

Referring again to FIGS. 2A and 2B, a heatsink 122 is attached to the backside 115 of the mounting frame 120 so that fins 124 of the heatsink 122 are inside the module housing (not shown). A cutaway top view of the module 100 is shown in FIG. 4. The heatsink 122 is in the path of airflow from a vented opening 126. A fan 128 guides cool air through the interchangeable node 108 for cooling the integrated circuits.

Figure 5A:
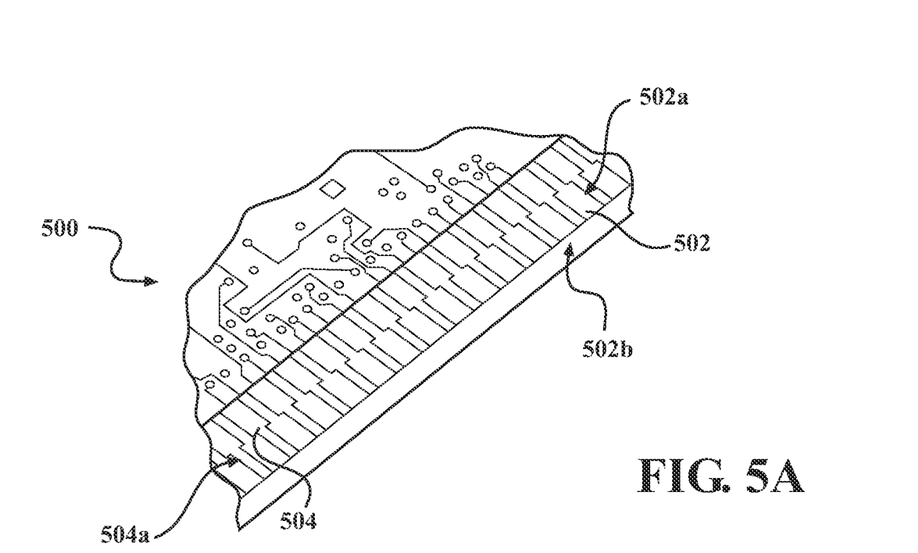
FIG. 5A is a perspective view of an exemplary connector for a mainboard.

The mainboard 106 has a connection, exposed at one panel of the housing, that is designed to easily, and inexpensively, interconnect with the interchangeable node 108. In one or more embodiments, a predetermined number of pins is available on the mainboard for the necessary signals, power, and ground. In one example, a maximum of 300 signals per SoC are available. A standard board-to-board connector (not shown) may be used. Alternatively, FIG. 5A shows an example of another possible configuration which comprises an edge connector 500. A first row 502 has top pins 502a and bottom pins 502b. A second row 504 has top pins 502a and bottom pins (not shown). In one or more embodiments, pins may be on the interchangeable computing node 108 and connectors 118 may be on the mainboard 106 (see FIG. 1D).

Figure 5B:
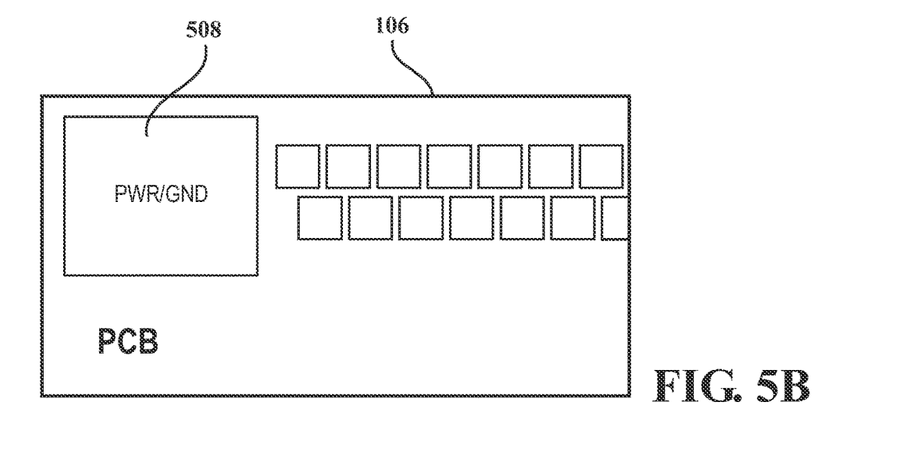
FIG. 5B is a block diagram of a printed circuit board power and signal connection for a mainboard.

Referring now to FIG. 5B, the mainboard 106 has large pads 508 for power and ground where power may be on the top side and ground may be on the bottom side. The large pads for power and ground should be closer to an edge of the mainboard to facilitate their connection is first when the interchangeable computing node (not shown) is plugged into the mainboard 106 to protect the node (not shown) and mainboard 106 from electrostatic discharge.

Because, in one or more embodiments, the main computing portion exists on the interchangeable node 108 and not on the mainboard 106, significant advantages are realized. The housing 101 may be more compact, leading to space and weight savings. Also, because there are fewer components on the mainboard 106, there is more airspace within the housing 101. Because of this, airflow to cool the integrated circuits is improved.

Figure 6A:
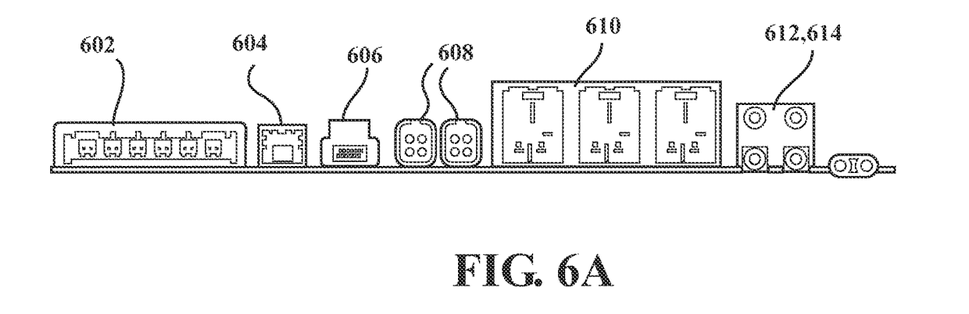
FIG. 6A is an exemplary diagram of connectors that are used to connect vehicle systems to a mainboard.

The modifiable connectors 104a, 104b on the core 102 are modular connectors that are standardized in size and are modularized in integration of different types of connections. FIG. 6A is an example of current connectors that are necessary for in-vehicle systems. They include, but are not limited to Ethernet 602, a camera 604. USB 606, rear view cameras and displays 608, vehicle connectors 610, antenna inputs for radio and/or satellite navigation inputs 612, and Bluetooth and/or WiFi networks 614. The number of external interfaces increases significantly with the increasing number of displays and cameras inside and outside of the vehicle cabin. In addition, when gateway functions are realized, communication interfaces for Ethernet, CAN and LIN connections also increase. The housing size and the mainboard size, however, remains fixed, which from a practical standpoint, limits the integration of a higher number of interfaces.

Figure 6B:
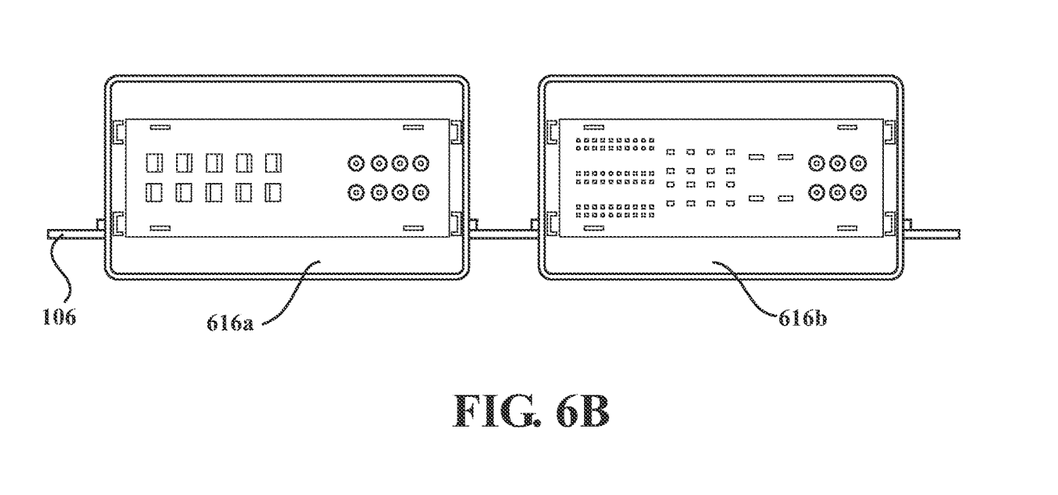
FIG. 6B is a configuration of integrated connectors to connect vehicle systems to a mainboard.

FIG. 6B shows an arrangement for increasing the number of interfaces without having to redesign connections for existing wire harness designs. One or more integrated connectors 616a and 616b have exchangeable pins that adapt to different inputs and outputs as they are needed, which need depends on different system levels and features on a vehicle. The standardized connectors offer a maximum availability with little to no modification. For example, when an upgraded or improved interchangeable node 108 is installed, there is no need to update the mainboard 106 or connectors 616a and 616b to accommodate the interchangeable node (not shown).

Figure 7:
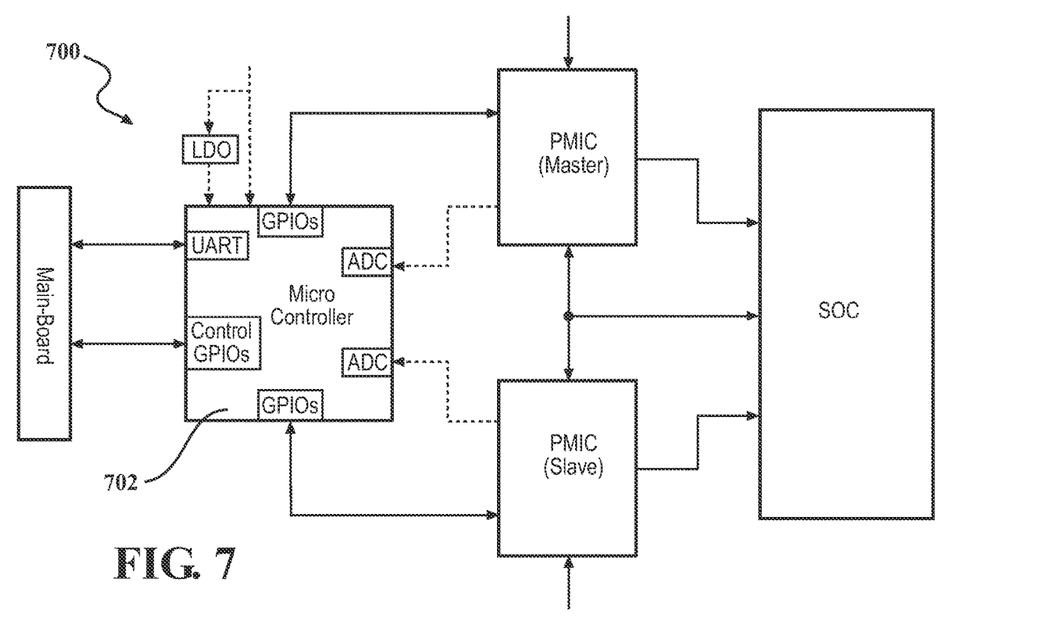
FIG. 7 is a block diagram of an interchangeable computing node having an additional microprocessor.

FIG. 7 is a block diagram 700 of an interchangeable node, that is a computing node, that has an additional microprocessor 702. Each OEM or supplier has different hardware requirements. The small microprocessor 702 manages the computing node control and diagnosis by way of a generic Compute Module Control Interface and generic Application Programming Interface (API) that are not dependent upon the hardware control signals of the SoCs. This generic control interface provides complete communication and end-to-end protection, thereby fulfilling the need to secure required and expected safety requirements of the system. The microprocessor 702 allows for the standardized control of the interchangeable computing node from the perspective of the mainboard 106. In addition, a main computing processor on the mainboard 106 does not have to consider any necessary timing requirements that may be needed for controlling the interchangeable computing node's power states. The microprocessor 702 has the capability to perform the SoC power rails voltage and other diagnosis directly on the interchangeable computing node 108 and simply manages hardware revision and configuration control. The microprocessor 702 also has the capability to synchronize and control different power stages (OFF, suspend to RAM, low power mode, ON) for two SoCs on the interchangeable computing node 108.

Figure 8:
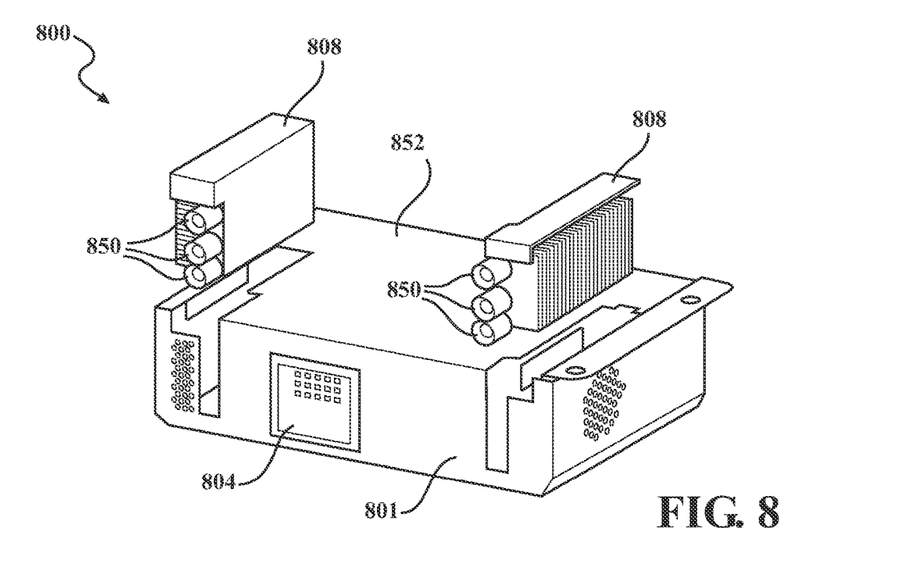
FIG. 8 is an exploded view of an interchangeable computing node including connectors.

As discussed above, the number of external interfaces is limited by the space within the housing. FIG. 8 is an exploded perspective view of one or more embodiments of the module 800 that provides the capability to expand the number of external interfaces wherein one or more interchangeable nodes 808 are equipped with additional connectors 850. The interchangeable computing node 808 with additional connectors 850 is accessible from a top 852 of the housing 801. The interchangeable computing node 808 connects to a mainboard (not shown) in the housing and the additional connectors 850 are accessible from a rear panel of the housing. A standardized connector 804, with pins configurable in a manner like connectors 104a and 104b described with reference to FIGS. 1, 6A and 6B, is part of the module 800 and may supplemented by the additional connectors 850 that are located directly on the interchangeable computing nodes 808.

Figure 9A:
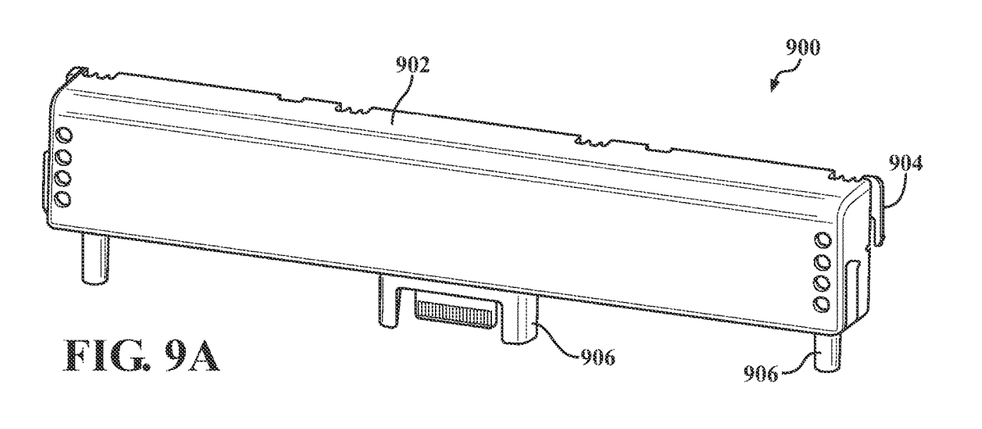
FIG. 9A is a perspective front view of a mounting frame.
Figure 9B:
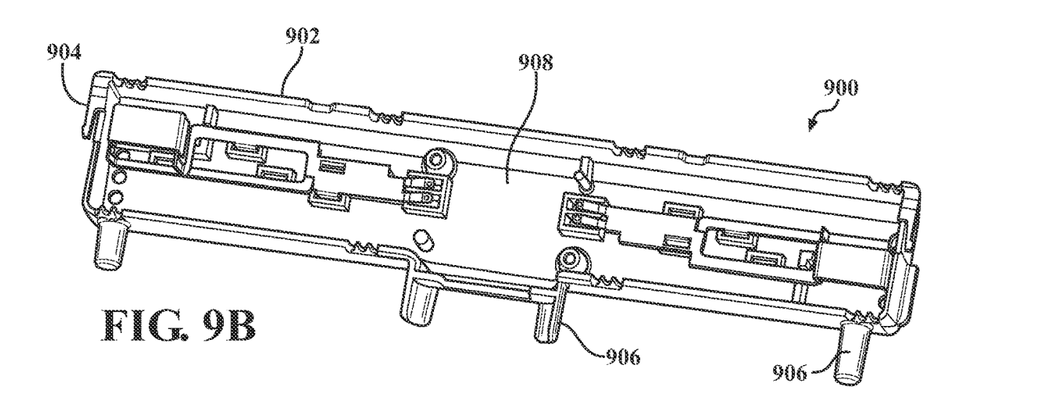
FIG. 9B is a perspective rear view of a mounting frame.
Figure 9C:
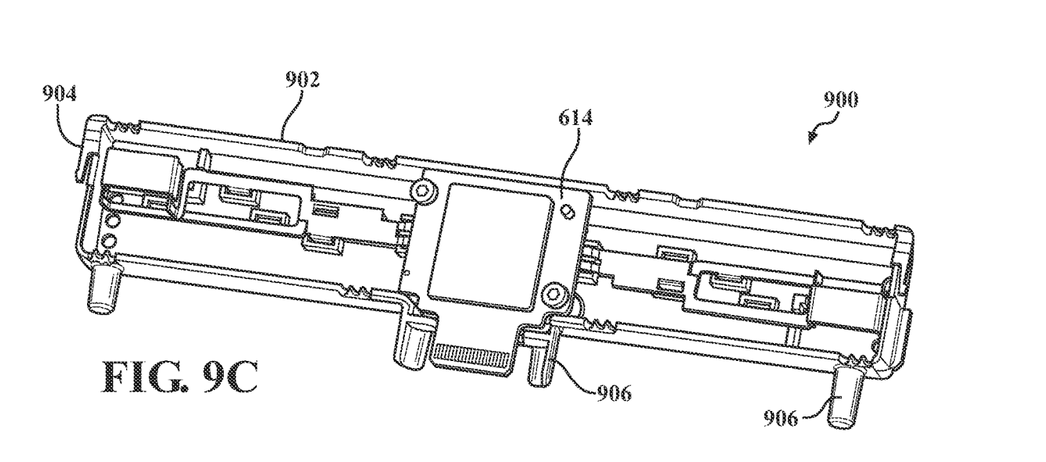
FIG. 9C is a perspective rear view of a mounting frame with an antenna.

In one or more embodiments, shown in FIGS. 9A-9C, the interchangeable node has connectors that are directed to connectivity 900, and is described hereinafter as an interchangeable connectivity node. FIG. 9A is a perspective front view of a mounting frame 902 and FIG. 9B is a perspective rear view of the mounting frame 902. The mounting frame 902 has one or more connectors 904 for connecting to the housing (not shown) and one or more connectors 906 for connecting to the mainboard (not shown).

In FIG. 9B, the mounting frame 902 has an area 908 for receiving a connectivity element, such as a connectivity antenna. In FIG. 9C, the Bluetooth and/or WiFi antenna 614 is fastened to the area 908 with fasteners 910, for example, making it modifiable. The Bluetooth and/or WiFi antenna 614 may be a high-performance antenna.

Several advantages may be realized by the interchangeable nodes 100, 800, 900 having interchangeable computing nodes 108, 808 and/or connectivity nodes 900. Flexibility and scalability of the module is realized in a way that is not available in current systems. The generic core 102 and mainboard 106 are essentially a blank canvas for multiple configurations of the interchangeable computing nodes 108. The computing nodes have the capacity to include one or more SoC and when there are multiple SoCs, they each may have different performances. This means that interchangeable computing nodes from one or more suppliers may be used across vehicle makes and models, from generation to generation, for many different applications. This also means that older vehicles can be easily upgraded to more current features available from an OEM, or lesser versions of a vehicle may be upgraded with features that are normally reserved for higher, more luxury, versions with the simple adjustment of replacing an interchangeable computing node with a new interchangeable computing node 108 having the upgraded SoC. Similarly, the connectivity nodes have the capacity to include BT/WiFi connectivity offering a high-performance antenna.

The connection, mechanical and electrical, between the mainboard 106 and the interchangeable computing node 108 is standardized. Therefore, the module 100 also provides the advantage that the generic core 102 and mainboard 106 are not OEM specific and may easily accommodate interchangeable computing nodes 108 from different suppliers.

The processing power is associated with the interchangeable computing node. Therefore, scaling of a vehicle program may be realized by using interchangeable computing nodes that have one or more SoCs, SOCs with different performance capabilities, different DRAM, and storage densities, adding additional accelerators to a main SoC, for example, AI chips such as a Graphic Processing (GPU) or Neural Processing (NPU) units.

The flexibility and modularity of the module 100 allows SoCs from different suppliers to be used in different regions without introducing compatibility issues. The core 102 of the module 100 may be re-used for several different purposes or customers merely by exchanging the interchangeable computing node 108. For example, the same core 102 can accommodate an interchangeable computing node 108 that is designed for any one of In-vehicle Infotainment (IVI), cockpit, Advanced Driver Assistance Systems (ADAS), etc. The most complex part of the module 100 is located on the interchangeable computing node 108. Therefore, the core 102 and mainboard 106 remain relatively inexpensive to implement and may be developed much faster than current approaches.

Also, because the computing portion of the module 100 is located on the interchangeable computing module and not on the mainboard 106 of the core 102, the housing 101 may be compact in size and the empty space now present on the mainboard 106 provides more space within the housing for increased air flow.

Another advantage to having the computing portion on the interchangeable computing node is that it is positioned away from other thermal hot spots or critical parts of the mainboard 106.

With the interchangeable computing node 108, capacitor placement may be on the opposite side of the SoC. So, yet another advantage is realized in that power integrity issues are avoided in comparison to a traditional System-in-a-Package Land Grid Array (SiP)/LGA approach.

The computing portion being part of the interchangeable node 108 allows for easier shielding and significantly lower sensitivity to neutron radiation on memory cells, which helps to decrease FIT.

The connectivity portion being part of the interchangeable node offers access to a high performance antenna for Bluetooth and/or WiFi connectivity.

In the foregoing specification, the present disclosure has been described with reference to specific exemplary embodiments. The specification and figures are illustrative, rather than restrictive, and modifications are intended to be included within the scope of the present disclosure. Accordingly, the scope of the present disclosure should be determined by the claims and their legal equivalents rather than by merely the examples described.

For example, the components and/or elements recited in any apparatus claims may be assembled or otherwise operationally configured in a variety of permutations and are accordingly not limited to the specific configuration recited in the claims.

Benefits, other advantages, and solutions to problems have been described above about embodiments; however, any benefit, advantage, solution to problem or any element that may cause any particular benefit, advantage, or solution to occur or to become more pronounced are not to be construed as critical, required, or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited but may also include other elements not expressly listed or inherent to such process, method, article, composition or apparatus. Other combinations and/or modifications of the above-described structures, arrangements, applications, proportions, elements, materials, or components used in the practice of the present disclosure, in addition to those not specifically recited, may be varied, or otherwise particularly adapted to specific environments, manufacturing specifications, design parameters or other operating requirements without departing from the general principles of the same.

What is claimed is:

1. An in-vehicle control device, comprising:
a housing;
a mainboard in the housing, the mainboard has at least one connection accessible at a first panel of the housing;
one or more connectors in a second panel of the housing, the one or more connectors are interconnected with the mainboard and accessible from outside the housing for connecting the mainboard to a vehicle system;
a mounting frame detachably connected to the housing at the first panel, wherein when detached, exposes the at least one connection to the mainboard; and
at least one interchangeable computing node detachably connected to the mounting frame, the at least one interchangeable computing node has a connector for connecting to the mainboard at the at least one connection at the first panel, the interchangeable computing node has scalable performance capabilities defined by at least one System-on-a-Chip (SoC) or a high-performance antenna.

2. The device of claim 1, wherein the interchangeable computing node has two SoCs on a single monolithic module attached to the mounting frame.

3. The device of claim 2, wherein the two SoCs on the interchangeable computing node are symmetrically adjacent each other.

4. The device of claim 1, wherein the high-performance antenna is an antenna for at least one of WiFi and Bluetooth.

5. The device of claim 1, wherein the mounting frame accommodates a heatsink attached to a backside of the mounting frame.

6. The device of claim 5, wherein the housing further comprises a vented opening and the heatsink further comprises a plurality of fins arranged on the mounting frame to face inside the housing in a path of the vented opening in the housing.

7. The device of claim 6, wherein the housing further comprises a fan.

8. The device of claim 1, wherein the mounting frame accommodates two interchangeable computing nodes and each interchangeable computing node further comprises:
one or more SoCs; and
a plurality of connectors for mating with the at least one connection exposed on the mainboard.

9. The device of claim 8, wherein each of the interchangeable computing nodes further comprises, in addition to the one or more SoCs, a managing microprocessor, the managing microprocessor has a generic compute module control interface and a generic application programming interface that are independent of control signals of the SoC to manage the interchangeable computing node control and diagnosis.

10. The device of claim 8, wherein the at least one connection exposed on the mainboard further comprises a modifiable connector capable of integrating multiple types of connectors in the plurality of connectors on the at least one interchangeable computing node.

11. The device of claim 10, wherein the modifiable connector on the mainboard further comprises exchangeable pins.

12. The device of claim 1, wherein the at least one interchangeable computing node further comprises, in addition to the at least one SoC, a managing microprocessor, the managing microprocessor has a generic compute module control interface and a generic application programming interface that are independent of control signals of the SoC to manage the at least one interchangeable computing node control and diagnosis.

13. An in-vehicle control device, comprising:
a housing;
a mainboard in the housing, the mainboard has a connection accessible at a first panel of the housing;
a mounting frame detachably connected to the housing at the first panel and wherein when detached, exposes the connection;
at least one interchangeable computing node detachably connected to the mounting frame, the at least one interchangeable computing node has scalable performance capabilities further comprises:
a connector for connecting to the mainboard connection accessible at the first panel;
at least one System-on-a-Chip (SoC); or
a high-performance antenna; and
at least one connector for connecting the SoC or high-performance antenna to a vehicle system.

14. The device as claimed in claim 13, wherein the at least one connector for connecting to a vehicle system is on a second panel of the housing.

15. The device as claimed in claim 13, wherein the at least one interchangeable computing node has two SoCs on a single monolithic module attached to the mounting frame.

16. The device as claimed in claim 13, wherein each of the at least one interchangeable computing node further comprises, in addition to the one or more SoCs, a managing microprocessor, the managing microprocessor has a generic compute module control interface and a generic application programming interface that are independent of control signals of the SoC to manage the interchangeable computing node control and diagnosis.

17. The device of claim 13, wherein the mainboard connection accessible at the first panel of the housing further comprises, a modifiable connector capable of integrating multiple types of connectors on the at least one interchangeable computing node for connecting to a vehicle system.

18. The device of claim 17, wherein the modifiable connector on the mainboard further comprises exchangeable pins.

19. The device of claim 13, wherein the high-performance antenna is an antenna for at least one of WiFi and Bluetooth.

* * * * *